(12) United States Patent  
Anderson et al.

(10) Patent No.: US 9,854,042 B2
(45) Date of Patent: Dec. 26, 2017

(54) AUTOMATED ASSESSMENT REPORT GENERATION

(71) Applicant: Dell Products, LP, Round Rock, TX (US)

(72) Inventors: Paul Anderson, Wet Boylston, MA (US); Stephen Williamson, Shrewsbury, MA (US); Howard Ernest Arnold, Londonderry, NH (US); Matthew C. Harris, Derry, NH (US)

(73) Assignee: Dell Products, LP, Round Rock, TX (US)

( * ) Notice: Subject to any disclaimer, the term of this patent is extended or adjusted under 35 U.S.C. 154(b) by 135 days.

(21) Appl. No.: 14/603,546

(22) Filed: Jan. 23, 2015

(65) Prior Publication Data

US 2016/0219104 A1    Jul. 28, 2016

(51) Int. Cl.
*G06F 15/173* (2006.01)
*H04L 29/08* (2006.01)
*H04L 12/26* (2006.01)

(52) U.S. Cl.
CPC ...... *H04L 67/1097* (2013.01); *H04L 43/0817* (2013.01); *H04L 43/04* (2013.01); *H04L 43/06* (2013.01)

(58) Field of Classification Search
USPC ................. 709/224, 223, 217, 202
See application file for complete search history.

(56) References Cited

U.S. PATENT DOCUMENTS 7,930,481 B1 *   4/2011  Nagler ................ G06F 12/0804
                                                      710/18
2008/0250042 A1 * 10/2008 Mopur .................. G06F 11/008
2009/0249213 A1 * 10/2009 Murase ................. G06F 9/4443
                                                      715/735
2009/0259749 A1 * 10/2009 Barrett ................ G06F 11/3495
                                                      709/224
2015/0095788 A1 *  4/2015 Thiele ................. G06F 3/04817
                                                      715/735

OTHER PUBLICATIONS

EMC Community Network—ECN:VMHEAT report. Retrieved from Internet May 6, 2015 https://community.emc.com/message/540239.
SAN NAS Analyst: VMware Host Environment Analysis Tool (VMHEAT) Retrieved from Internet May 6, 2015 http://san-nasanalyst.blogspot.com/2010/01/vmware-host-environment-analysis-tool.html.
EMC Community Network—ECN: Failing to Generate HEAT for ESX servers Retrieved from Internet May 6, 2015 https://community.emc.com/thread/95126.

* cited by examiner

*Primary Examiner* — Lan-Dai T Truong
(74) *Attorney, Agent, or Firm* — Hamilton, Brook, Smith & Reynolds, P.C.

(57) ABSTRACT

A method of characterizing a storage area network (SAN) includes collecting information associated with the SAN, analyzing the collected information, generating an assessment of one or more aspects of the SAN based on the analyzing, and reporting the assessment. The information collected may include one or more of host information, storage information and network information. The analyzing may further include evaluating information from two or more subsystems that constitute the SAN, and the assessment may be based on technical knowledge associated with the two or more subsystems.

20 Claims, 4 Drawing Sheets

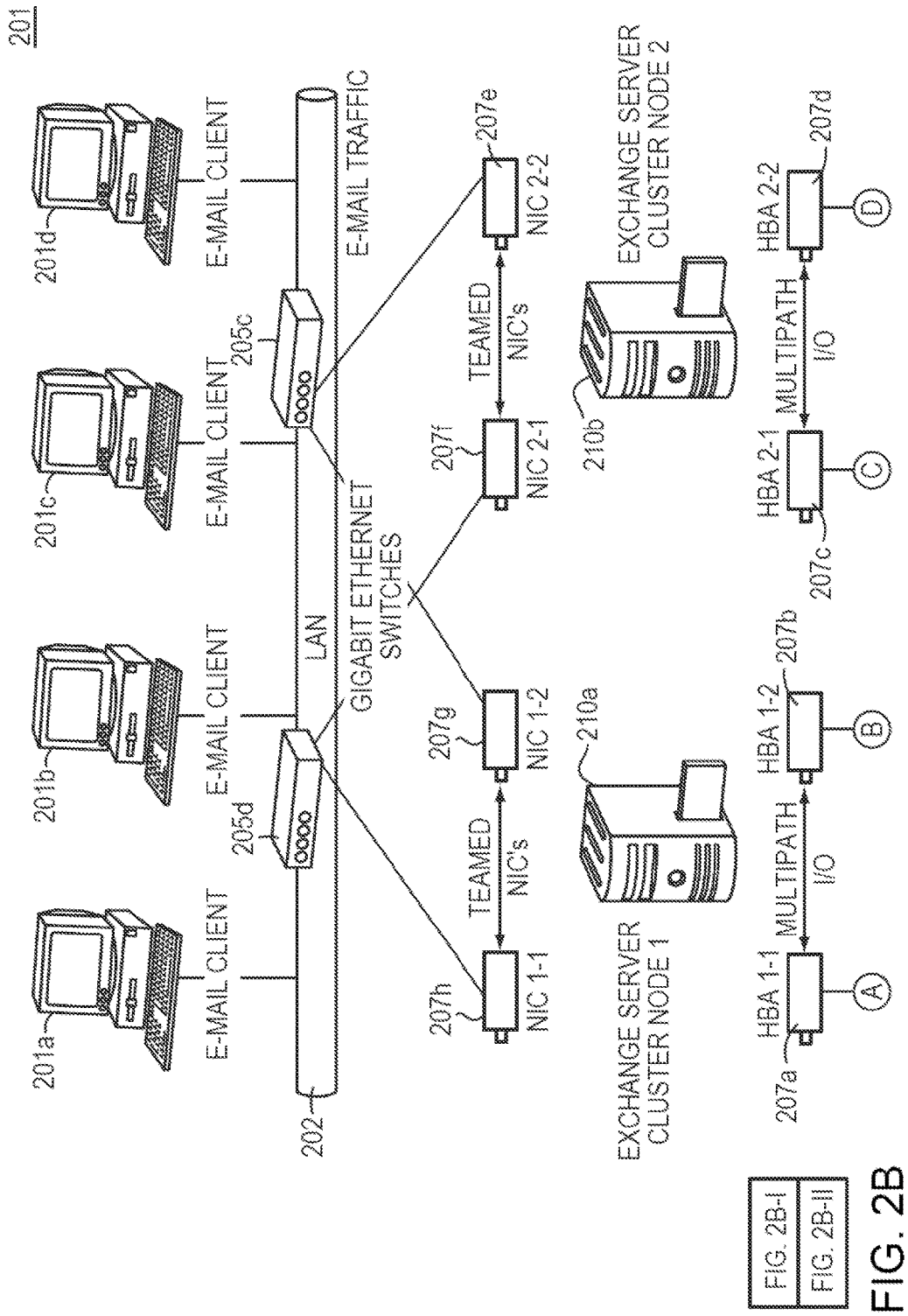

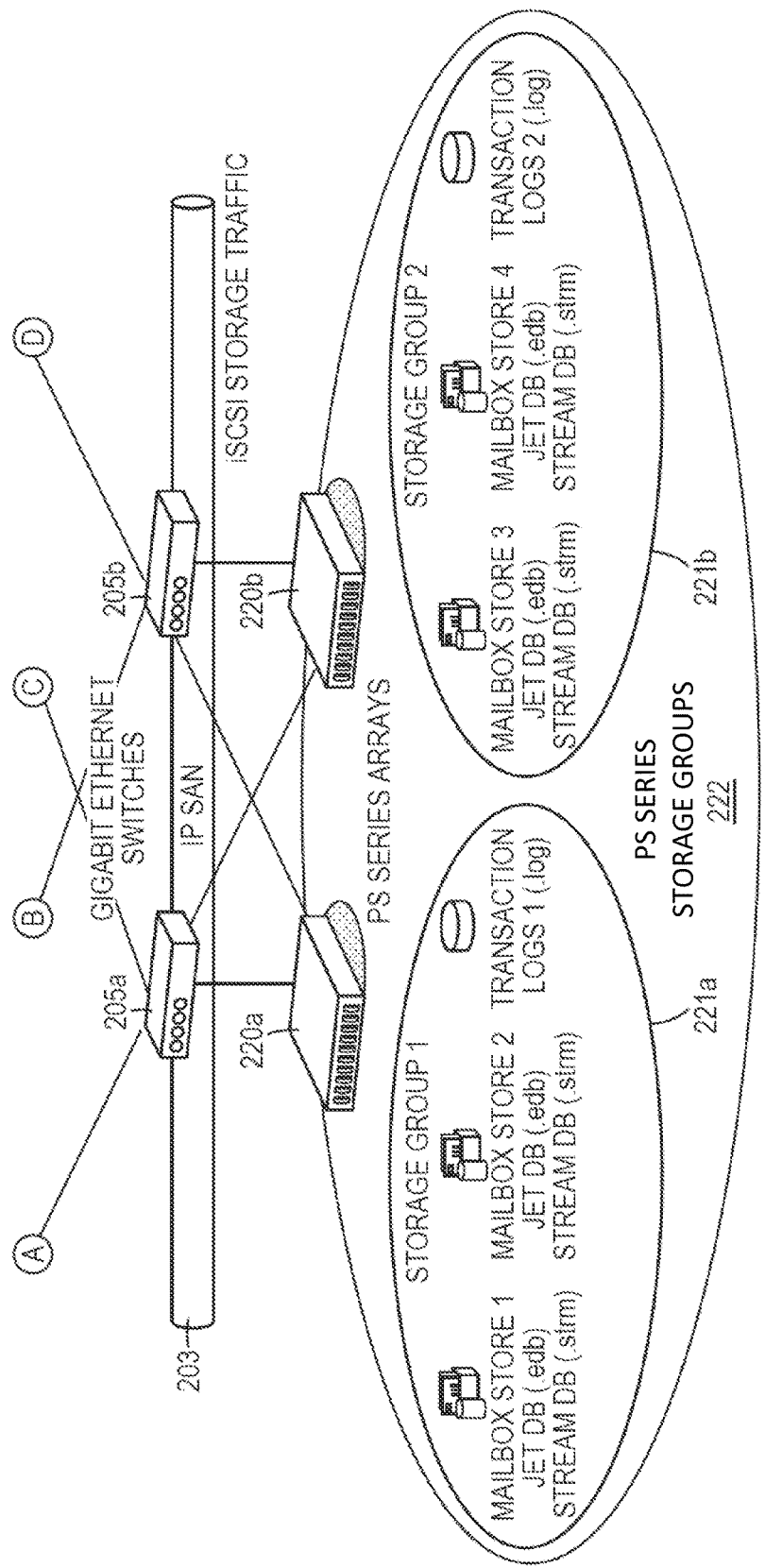
FIG. 2B-ii

AUTOMATED ASSESSMENT REPORT GENERATION

BACKGROUND OF THE INVENTION

As the value and use of information continues to increase, individuals and businesses seek additional ways to process and store information. One option available to users is information handling systems.

An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated.

The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems (which may be configured as a Storage Area Network (SAN)), and networking systems.

Information handling systems typically consist of a complex collection of many different devices, all integrated to perform the required functions of the system. Because of the wide range of functionality (e.g., computing, storage, switching, routing, etc.), the system components may be manufactured and distributed by several different vendors, each of which specializes in a particular aspect of the system.

This diversity of system component vendors can create problems with troubleshooting the system, when performance degrades or a failure occurs. Diagnostic capabilities that exist when using various components provide by a common vendor, may not be available when the connected components are procured from different companies.

Another difficulty that arises when troubleshooting such a complex system is a lack of overall system knowledge. Generally, no individual member of the technical maintenance team will have knowledge of all aspects of the system, sufficient to competently handle any problem that may arise.

Maintenance philosophies often rely on multiple technical teams, each of which focuses on a particular aspect of the system. For example, one technical team may specialize on network communications, while another technical team specializes on data storage, while yet another technical team has expertise in system control and management. The knowledge bases for various parts of the system may therefore be distributed across multiple technical groups.

SUMMARY

The described embodiments concern analysis of a system as a whole, rather than by evaluating isolated portions of the system.

In one aspect, as shown in example embodiment of FIG. 1, the described embodiments may be directed to a method of characterizing a storage array network (SAN), including collecting 102 information associated with the SAN, analyzing 104 the collected information, generating 106 an assessment of one or more aspects of the SAN based on the analyzing, and reporting 108 the assessment. The assessment may be reported to a user of the SAN, a maintainer of the SAN or any other entity associated with the SAN.

In one embodiment, the information collected includes one or more of host information, storage information and network information. The host information may characterize one or more aspects of a host device. The host information may include one or more of server type, server quantity, server vendor, operating system types, and operating system vendors. These are only examples of types of host information; the embodiments described herein may use other types or instances of host information as an alternative or in addition to the examples set forth above.

In one embodiment, the storage information may characterize one or more aspects of a data storage device. The storage information may include one or more of storage device type, storage device quantity, server device vendor, and server device storage capacity. These are only examples of types of storage information; the embodiments described herein may use other types or instances of storage information as an alternative or in addition to the examples set forth above.

In one embodiment, the network information may characterize one or more aspects of a network component. The network information may include one or more of switching device quantity, switching device vendors, switching device type, and switching device interconnection information. These are only examples of types of network information; the embodiments described herein may use other types or instances of network information as an alternative or in addition to the examples set forth above.

In one embodiment, the one or more aspects of the network may include switch characterization. In another embodiment, the one or more aspects of the network include server characterization. In another embodiment, the one or more aspects of the network may include storage device characterization. In another embodiment, the one or more aspects of the network may include network interconnect characterization. In another embodiment, the one or more aspects of the network may include device chassis characterization In another aspect, the described embodiments may be directed to a method of assessing operational capability of a computing system, including acquiring information from across the computing system, the information characterizing one or more components of the computing system. The method further includes analyzing the acquired information, and generating an assessment of one or more aspects of the network based on the analyzing.

In one embodiment, the computing system consists of at least two subsystems, and the analyzing further includes evaluating information from two or more of the subsystems. In another embodiment, the assessment is based on technical knowledge associated with two or more of the subsystems.

In one embodiment, the information collected includes one or more of host information, storage information and network information.

In another aspect, the invention is a non-transitory computer-readable medium with computer code instruction stored thereon. The computer code instructions when executed by a processor cause an apparatus to collect information associated with a network system, analyze the collected information, and generate an assessment of one or more aspects of the network based on the analyzing.

In one embodiment, the computer code instructions when executed by a processor further cause an apparatus to report the assessment to a user of the network system. In another embodiment, the computer code instructions when executed by an a processor further cause an apparatus to evaluate information collected from two or more subsystems that constitute the network system.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 2B (FIGS. 2B-I and 2B-II) is a block diagram view of another computer network environment in which one or more of the described embodiments may be implemented.

DETAILED DESCRIPTION

Figure 1:
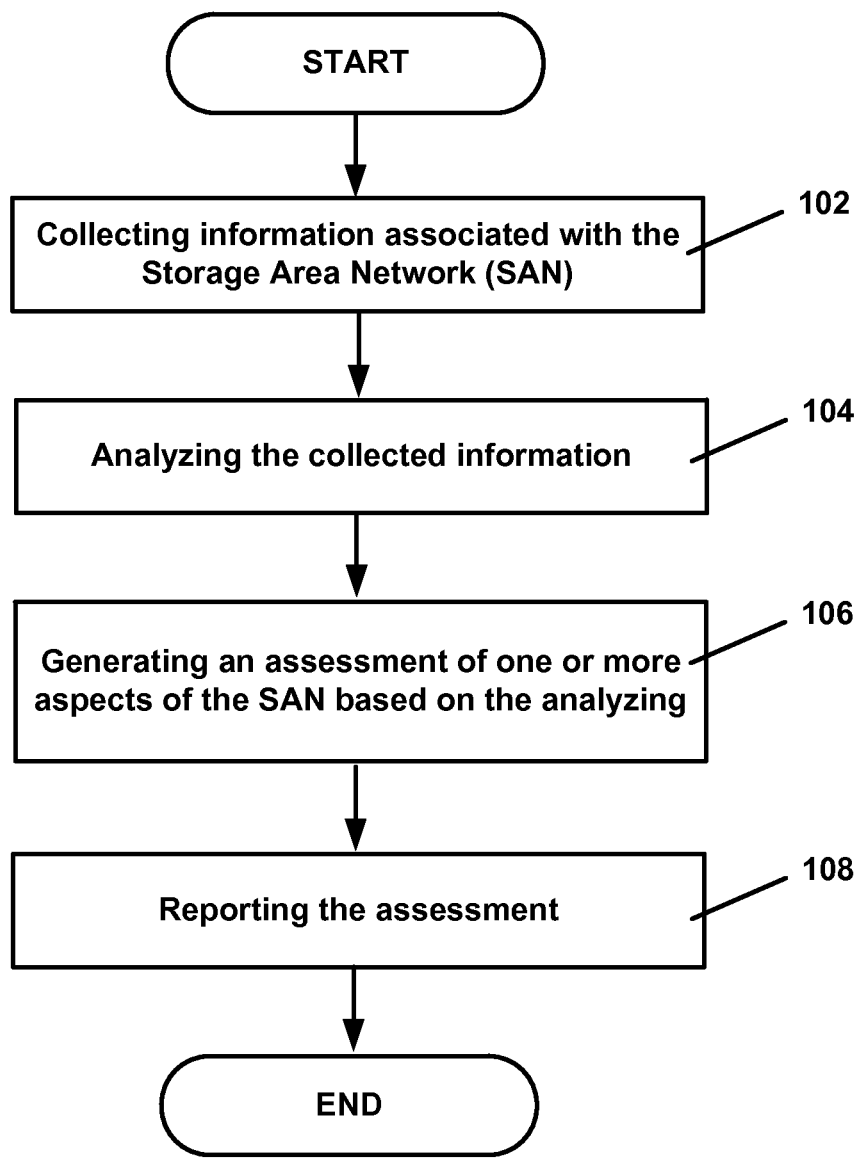
FIG. 1 is a flow diagram illustrating an embodiment of a method of assessing the operational capability of a computing system or network system.

A description of example embodiments follows.

The described embodiments concern analysis of a system as a whole, rather than by evaluating isolated portions of the system. One embodiment characterizes a network by collecting information associated with the network, analyzing the collected information, and generating an assessment of one or more aspects of the network based on the analyzing. The assessment may then be reported to a user, administrator or maintainer of the system.

The data collection provides a sample of the overall network configuration associated with the system. In one embodiment, a tool such as Dell's Lasso may provide a snapshot view of a network infrastructure that may include servers, enclosures, and network equipment such as Storage Area Network (SAN), Local Area Network (LAN) and Network Attached Storage (NAS). The snapshot view may include device and interconnection information that is sourced by a variety of vendors and manufacturers.

The snapshot view may be analyzed to produce an assessment of the overall health of the system. In one embodiment, the analysis may rely on selected input from across the entire system, so that an assessment of any particular component or connection may be based on configuration information from any other part (or parts) of the system.

The types of information gathered during the data collection may include, for example, host information (i.e., information associated with the system host entity), storage information (i.e., information associated with data storage components of the system), and network interconnection information (i.e., information associated with communications aspects of the system).

Host Information—

Host information may include parameters such as, for example, one or more of server type, server quantity, server vendor, operating system type (or types), and operating system vendors. In an example Windows server operating system environment, the following specific information may be gathered, although similar information associated with other operating systems may also be used:

Host parameters collected associated with reliability may include, for example, (1) Disk TimeOutValue, (2) one or more optional Operating System Knowledge Bases, (3) Internet Small Computer System Interface (iSCSI) Initiator version, (4) Microsoft Device Specific Module (DSM) version, (5) PCI (or PCIe) slot for Network Interface Controller (NIC), and (6) NIC Driver and Firmware.

Parameters collected that relate to required host changes, updates/upgrades and other considerations may include, for example, (1) PDORemovePeriod (where PDO=Path DOwn), (2) PathRecoveryInterval, (3) UseCustomPathRecoveryInterval, (4) LinkDownTime, (5) Broadcom NIC models 57810/57840 single function mode configuration, Disk/TimeOutValue, (6) LinkDownTime, (7) EnableNOPOut, (8) DelayBetweenReconnect, DelayACK, (9) identification of iSCSI NIC's make/model, (10) Dell DSM version, (11) HitKit versions, (12) NIC binding order, (13) Connections count per member/volume, (14) Connections per Group/volume, (15) Use IPV4, (16) Use IPV6, (17) EqualLogic Host Connection Manager (EHCM) service status, (18) Load Balance type, (19) Configured storage device (EqualLogic) Groups, (20) Group name, (21) Group IP address, (22) Subnets included, (23) Subnets excluded, (24) number of connections per iSCSI NIC, (25) NIC Name, (26) MTU size, (27) Receive Side Scaling, (28) Virtual Machine Queue (VMQ), (29) Port ID, (30) Internet Protocol version 4 (IPv4) address, (31) Internet Protocol version 6 (IPv6) Address, and (32) Transmit buffers.

Parameters collected that relate to optional host changes, if implemented, may include (1) Broadcom NIC models 57810/57840 Multi-function mode, (2) Use Multi Path I/O (MPIO) for snapshots, (3) Ethernet port Maximum Transmission Unit (MTU), and (4) Data Center Bridging (DCBx) settings from Network Adapters.

Storage Information—

Storage subsystem information may include parameters such as, for example, one or more of storage device type, storage device quantity, server device vendor and server device storage capacity. In an example multi-vendor storage environment the following specific information may be gathered, although similar information associated with other storage environments may also be used.

Storage parameters collected associated with reliability may include (1) Port-to-port ping validation, (2) Firmware, (3) Disk Firmware, and (4) Ethernet port MTU.

Parameters collected that relate to required storage subsystem changes, updates/upgrades and other considerations may include, for example, (1) Syslog set up, (2) Simple Mail Transfer Protocol (SMTP) set up, (3) Network Time Protocol (NTP) set up, (4) connected devices by port, (5) Connected switch name. (6) Port name, (7) Media Access Control (MAC) Address System description, (8) Member setting, (9) Pool configuration, (10) Group overall configuration, (11) Connection counts by member, (12) Pool and group connection count by volumes, (13) Volume access method settings, (14) Pool space, (15) Member space, (16) Group space, and (17) Connection count by pool Parameters collected that relate to optional storage subsystem changes, if implemented, may include (1) DCB state, (2) VLAN ID, (3) iSCSI Type/Length Value (TLV), (4) Priority Flow Control (PFC) State, (5) Enhanced Transmission Selection (ETS) State, (6) Current Operating Mode, (7) Management configuration, and (8) Sync Rep volume state.

Some iSCSI network storage subsystems, such as Dell EqualLogic arrays, utilize the networks that they are connected to communicate between individual chassis assigned to a group. The intercommunication traffic requires that all network switches within the environment have properly configured switch ports, proper cabling, and the switch interconnections are properly sized to support the current configuration.

A switch in the environment that is not properly configured can have a substantial impact on system performance. At least one embodiment automatically evaluates the system's array ports, switch ports, cables, and lags in the environment and will automatically flag (i.e., highlight, tag, mark or otherwise call attention to in some way) any component that is configured incorrectly.

Network Information—

Network information may include parameters such as, for example, one or more of switching device quantity, switching device vendors, switching device type, switching device interconnection information. In an example multi-vendor network environment the following specific information may be gathered, although similar information associated with other network environments may also be used.

Network parameters collected associated with network reliability may include (1) Component Make, (2) Component Model, (3) Component Service tag, (4) Management Status, (5) IP address, (6) Unit number, (7) "Up" time (i.e., amount of time the associated component has been operating), (8) Firmware version, (9) Component status (e.g., Ethernet switch status), (10) Hardware revision or version, (11) Protocols that have been enabled and/or configured, (12) Component Temperature (e.g., instantaneous "snapshot" temperature or as a profile over time), (13) Component Fan status, (14) Power Supply Unit fan status, (15) Power Supply Unit status, (16) Link state, (17) Thermal Sensor information, (18) Media type (e.g., small form-factor pluggable (SFP), quad SFP (QSFP), among others).

Parameters collected that relate to required network changes, updates/upgrades and other considerations may include, for example, (1) Connected device Medium Access Control (MAC) address, (2) Protocols enabled/configured, (3) Flow Control parameters, (4) Flow Control status, (5) Configured VLANs, (6) VLAN names, (7) VLANs defined at each port, (8) Port speed, (9) Link state, (10) Maximum transmission unit (MTU), (11) MAC addresses seen at each port, (12) Link Layer Discovery Protocol (LLDP) parameters (e.g., LLDP remote chassis MAC, LLDP remote port ID, LLDP Remote system name, among others).

Parameters collected related to optional network changes, if implemented, may include (1) Spanning Tree, (2) Root ID, (3) Root Priority, (4) Path cost by port, (5) Bridge ID, (6) Bridge Priority, (7) ETS configured by port, (8) ETS Recommended by port, (9) PFC setting by port, (10) Application Priority by port, (11) LLDP remote chassis MAC, (12) LLDP remote port ID, (13) LLDP Remote system name, (14) Remote peer DCBx status and/or type, (15) Traffic class by port, (16) Traffic Class Group by port, (17) Traffic priority by port, (18) Bandwidth by port, (19) DCB enabled/disabled.

The described embodiments may characterize network switches, among other network components. For example, PowerConnect switches have a capability to use a single instance of spanning tree or multiple instances of spanning tree. When multiple spanning tree instances are used, alignment to VLANs may be required. One embodiment views the total network infrastructure, with respect to spanning tree, to ensure that if a single switch were to fail in a SAN usage model, then an alternate switch for the SAN can continues to maintain a substantial number of data paths. This embodiment therefore reduces the likelihood that a single switch failure completely shuts off data access.

A Maximum Transmission Unit (MTU) of 9000 may provide better performance than the standard MTU size. One embodiment may identify the VLAN allocated to iSCSI traffic. The embodiment may then identify and flag (or otherwise highlight) any port with less than MTU 9000, so that steps may be taken to ensure that any port associated with the iSCSI VLAN has an MTU of 9000 or greater.

The Microsoft Windows OS is distributed in many different versions and under several configurations. OS updates and patches may be distributed, associated with a Knowledge Base (KB) number. Certain KB numbers are mandatory for iSCSI use. Further, other KBs may be recommended based on specific usage of a system. One embodiment identifies all mandatory and recommended KBs that should be applied to the system. In this embodiment, the mandatory and recommended KBs that have not been applied may be applied. Confirmation may be required to carry out the application of the missing KBs, or the execution may be carried out automatically.

In some embodiments (e.g., Dell EqualLogic systems), iSCSI storage deployment is implemented with at least one pair of SAN switches to provide resiliency to fault conditions. When two or more switches are employed in a SAN, however, the switches must be interconnected with a port channel or similar communications path. The capacity of this port channel is a multiple of the number of Ethernet ports on each storage array. The described embodiment may assess whether the port channel capacity is adequate for use and may provide feedback as to what size the port channel should be if undersized.

In some embodiments, the collected information may include device chassis data. Examples of such chassis information may include (1) Chassis name, (2) IP-Address, (3) System Model, (4) Service Tag, (5) Midplane Version, (6) MAC Address, (7) Chassis Management Controller (CMC) slot location, (8) Firmware identifier and version, and (9) Role or function.

Chassis data may further include chassis switch slot information, such as (1) Slot Name, (2) Slot Type, (3) Switch Model, (4) Switch Service Tag, (5) Slot Role, (6) Presence, and (7) Display Name.

Chassis data may further include chassis server slot information, such as (1) Slot Name, (2) Blade Type, (3) Host Name, (4) Service Tag, (5) Bios Version, (6) Presence, (7) Mezz-B type and model, and (8) Mezz-C type and model.

Figure 2A:
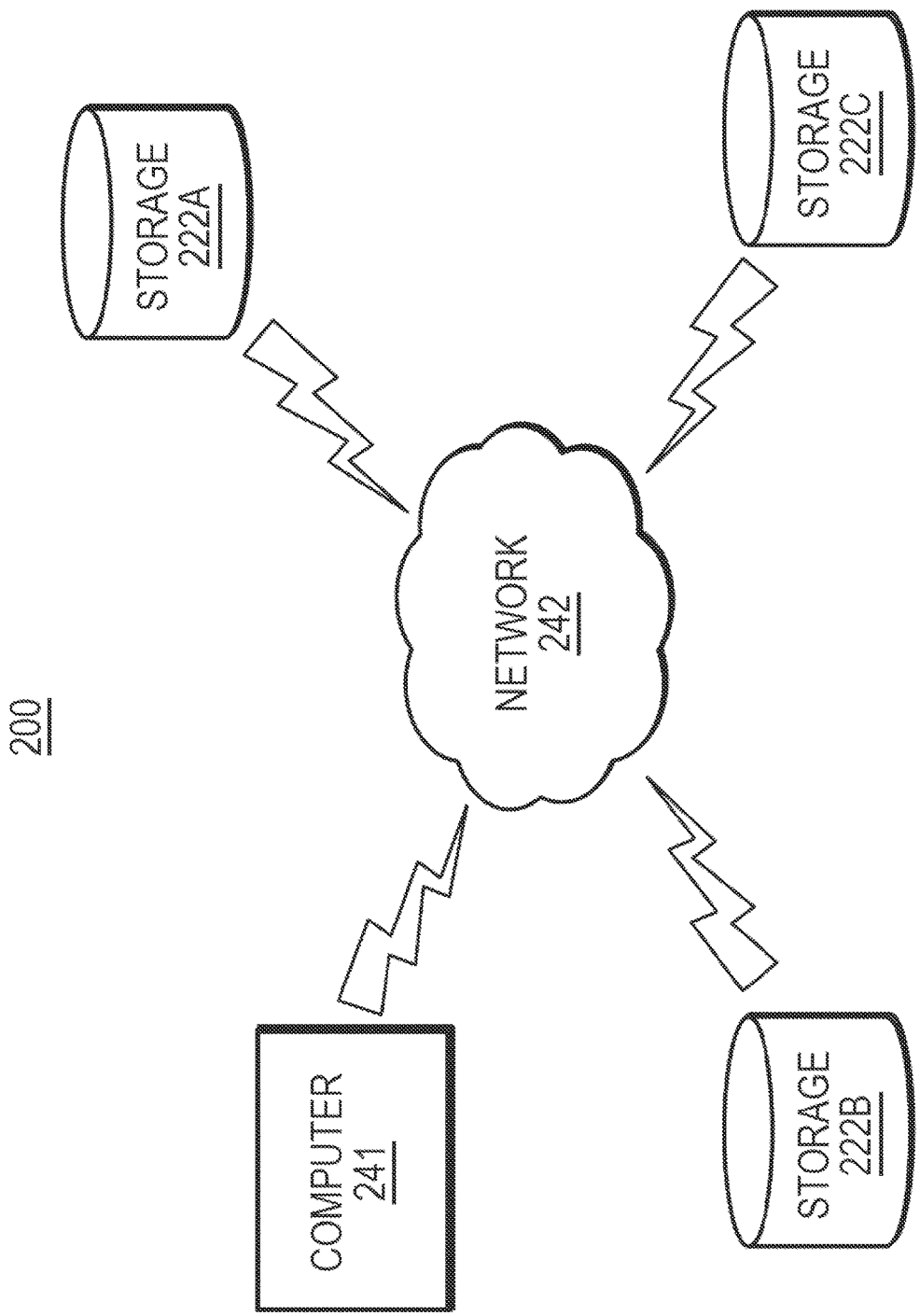
FIG. 2A is a schematic view of a computer network environment in which one or more of the described embodiments may be implemented.

FIG. 2A illustrates a computer network environment 200 in which an embodiment of the present invention may be implemented. The computer 241 and the sets 222A, 222B, 222C of one or more storage devices (each one of the sets 222A, 222B, 222C representing one or more storage devices) are linked through network 242. The computer 241 and the sets 222A, 222B, 222C of one or more storage devices may be connected through any network as is known in the art, including a storage area network (SAN), a wide area network (WAN) or local area network (LAN). The computer 241 may embody a SAN characterizing system as described herein. While three sets 222A, 222B, 222C of storage devices are depicted, the computer network environment 200 may comprise any number of computers, network devices and/or storage devices.

As illustrated in FIG. 2B (FIGS. 2B-I and 2B-II), in one embodiment, the present invention may run on a network 201 that may include, but is not limited to, a storage area network (SAN) 203 and a local area network (LAN) 202. The LAN 202 may include components such as one or more clients 201*a*, 201*b*, 201*c*, 201*d* that communicate through one or more network switches 205*c*, 205*d* to one or more network interface cards (NICs) 207*e*, 207*f*, 207*g*, 207*h* to one or more servers 210*a*, 210*b*. The SAN 203 may include, but is not limited to, an internet protocol (IP) SAN. The SAN 203 may include components such as one or more servers 210*a*, 210*b* that communicate to one or more network switches 205*a*, 205*b* through a set of one or more network interface cards (NICs) 207*a*, 207*b*, 207*c*, 207*d*. Network switches 205*a*, 205*b* of the storage area network 203 may communicate to Peer Storage (PS) series arrays 220*a*, 220*b* across the SAN 203. Therefore, the SAN 203 may include components such as a PS series group 222 that may include, but is not limited, to, storage groups 221*a*, 221*b* and PS series data arrays 220*a*, 220*b*. The PS series group 222 may include a given set (referring to each of 222A, 222B, and 222C of FIG. 2A) of storage devices. In an alternative embodiment, the SAN 203 may be considered to include the LAN 202 and the above-mentioned components with which the LAN 202 communicates, in addition to the above-mentioned components with which the SAN 203 communicates.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

The described embodiments may utilize one or more of the following example processes to analyze collected system information and generate an assessment of the system based on the analysis. The described embodiments are not limited to these examples, and may use other functions alternatively or in addition to the functions described below.

CalculateFreeSpace—Calculates free disk space percentages. This process includes 3 fields, and flags disk space percentages below a predetermined threshold.

CheckDriveFirmware—Checks database for required disk firmware versions. This process includes 1 field, and flags outdated disk firmware versions.

CheckHotfixes—Checks database for required Windows hotfixes. This process provides automatic entry of issues for servers without required hotfixes.

DisplayCmcFirmware—Gathers and formats CMC data for analysis by other processes.

CheckVMnics—Checks VMware systems for adapters with an iSCSI driver but no vmknics. This process includes 1 field, and flags any unbound VMware Network Interface Controllers (NICs).

MatchArrayMacAddresses—Gathers switch, port and port channel data and matches with storage array data to calculate connections between them.

CombineLassoPortData—Combines and matches port data from different Lasso data structures.

ConvertUnixTime—Formats Unix seconds and time fields into date and elapsed time values.

DisplayDcbBandwidth—Gathers DCB data to clearly present data needed for analysis.

DisplayForce10DcbData; DisplayPowerConnectDcbData—Gathers and processes DCB data from different Lasso data structures to present data needed for analysis.

DisplayPowerConnectPortFast—Copies Lasso data to clearly present data needed for analysis.

FormatOsVersion—Abbreviates operating system version strings.

SetServerType—Identifies physical and virtual servers.

InBladeChassis—Gathers data about Blade chassis to connect Chassis and Slot information with devices housed in chassis.

AbbreviateSpace—Formats disk space and memory fields into MB, GB and TB values.

AbbreviateSpeed—Formats speed values into Mb and Gb values.

ReplaceFields—Manipulates text in displayed fields by adding, removing or changing specified values.

CheckForFluidFsCollection—Matches NAS devices with EqualLogic arrays.

DeleteEmptyDevices—Deletes empty or invalid device data from Lasso collection.

PopulateGraphData—Gathers graph images entered by analyst and puts them in correct place in report.

SetToc—Parses all data in analysis and automatically constructs Table of Contents.

It will be apparent that one or more embodiments described herein may be implemented in many different forms of software and hardware. Software code and/or specialized hardware used to implement embodiments described herein is not limiting of the embodiments of the invention described herein. Thus, the operation and behavior of embodiments are described without reference to specific software code and/or specialized hardware—it being understood that one would be able to design software and/or hardware to implement the embodiments based on the description herein.

Further, certain embodiments of the example embodiments described herein may be implemented as logic that performs one or more functions. This logic may be hardware-based, software-based, or a combination of hardware-based and software-based. Some or all of the logic may be stored on one or more tangible, non-transitory, computer-readable storage media and may include computer-executable instructions that may be executed by a controller or processor. The computer-executable instructions may include instructions that implement one or more embodiments of the invention. The tangible, non-transitory, computer-readable storage media may be volatile or non-volatile and may include, for example, flash memories, dynamic memories, removable disks, and non-removable disks.

While this invention has been particularly shown and described with references to example embodiments thereof, it will be understood by those skilled in the art that various changes in form and details may be made therein without departing from the scope of the invention encompassed by the appended claims.

What is claimed is:

1. A method of characterizing a storage array network (SAN), comprising:
    a processor; and
    a memory with computer-executable instructions stored thereon, the memory operatively coupled to the processor such that, when executed by the processor, the computer-executable instructions cause the SAN to implement:
    collecting information associated with the SAN, the information comprising:
        hardware aspects that comprise device quantity, device type, device vendor, and device storage capacity,
        configuration aspects that comprise hardware component version, software component version, and firmware component version, and
        communication operation aspects that comprise MAC address, IP address, and enabled protocols;
        the information characterizing:
            (i) neighboring components, comprising switching devices, host devices and storage devices, that are local to the SAN and
            (ii) system components that are part of a system hosting the SAN;
    analyzing the collected information that characterizes the neighboring components and the system components;
    generating an assessment of one or more aspects of the SAN based on the analyzing, the assessment taking into consideration a combination of the neighboring components and the system components, such that the assessment characterizes behavior of the SAN within the system, and
    reporting the assessment.

2. The method of claim 1, wherein the information collected includes one or more of host information, storage information and network information.

3. The method of claim 2, wherein the host information characterizes one or more aspects of a host device.

4. The method of claim 2, wherein the host information includes one or more of server type, server quantity, server vendor, operating system types, and operating system vendors.

5. The method of claim 2, wherein the storage information characterizes one or more aspects of a data storage device.

6. The method of claim 2, wherein the storage information includes one or more of storage device type, storage device quantity, server device vendor, and server device storage capacity.

7. The method of claim 2, wherein the network information characterizes one or more aspects of a network component.

8. The method of claim 7, wherein the one or more aspects of the network component include switch characterization.

9. The method of claim 7, wherein the one or more aspects of the network component include server characterization.

10. The method of claim 7, wherein the one or more aspects of the network component include storage device characterization.

11. The method of claim 7, wherein the one or more aspects of the network component include network interconnect characterization.

12. The method of claim 7, wherein the one or more aspects of the network component include device chassis characterization.

13. The method of claim 2, wherein the network information includes one or more of switching device quantity, switching device vendors, switching device type, and switching device interconnection information.

14. A method of assessing operational capability of a computing system, comprising:
    a processor; and
    a memory with computer-executable instructions stored thereon, the memory operatively coupled to the processor such that, when executed by the processor, the computer-executable instructions cause the system to implement:
    acquiring information from across the computing system, the information comprising:
        hardware aspects that comprise device quantity, device type, device vendor, and device storage capacity,
        configuration aspects that comprise hardware component version, software component version, and firmware component version, and communication operation aspects that comprise MAC address, IP address, and enabled protocols;
        the information characterizing:
            (i) neighboring components, comprising switching devices, host devices and storage devices, that are local to the computing system and
            (ii) system components that are part of a system hosting the computing system;
    analyzing the acquired information that characterizes the neighboring components and the system components; and
    generating an assessment of one or more aspects of the computing system based on the analyzing, the assessment taking into consideration a combination of the neighboring components and the system components, such that the assessment characterizes behavior of the computing system within the system hosting the computing system.

15. The method of claim 14, wherein the computing system consists of at least two subsystems, and the analyzing further includes evaluating information from two or more of the subsystems.

16. The method of claim 15, wherein the assessment is based on technical knowledge associated with two or more of the subsystems.

17. The method of claim 14, wherein the information collected includes one or more of host information, storage information and network information.

18. A non-transitory computer-readable medium with computer code instruction stored thereon, the computer code instructions when executed by an a processor cause an apparatus to:
    collect information associated with a storage array network (SAN), the information comprising:
        hardware aspects that comprise device quantity, device type, device vendor, and device storage capacity,
        configuration aspects that comprise hardware component version, software component version, and firmware component version, and
        communication operation aspects that comprise MAC address, IP address, and enabled protocols;
        the information characterizing:
            (i) neighboring components, comprising switching devices, host devices and storage devices, that are local to the SAN and
            (ii) system components that are part of a system hosting the SAN;

analyze the collected information that characterizes the neighboring components and the system components; and generate an assessment of one or more aspects of the SAN system based on the analyzing, the assessment taking into consideration a combination of the neighboring components and the system components, such that the assessment characterizes behavior of the SAN within the system.

19. The non-transitory computer-readable medium of claim 18, the computer code instructions when executed by a processor further cause an apparatus to report the assessment to a user of the SAN system.

20. The non-transitory computer-readable medium of claim 18, the computer code instructions when executed by a processor further cause an apparatus to evaluate information collected from two or more subsystems that constitute the SAN system.

\* \* \* \* \*